United States Patent
Michi et al.

(10) Patent No.: US 6,853,903 B2
(45) Date of Patent: Feb. 8, 2005

(54) METHOD FOR CRUISE CONTROL AND DISTANCE REGULATION IN MOTOR VEHICLES

(75) Inventors: Harald Michi, Oelbronn-Duern (DE); Michael Scherl, Asperg (DE); Michael Weilkes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/414,656

(22) Filed: Apr. 16, 2003

(65) Prior Publication Data

US 2004/0010362 A1 Jan. 15, 2004

(30) Foreign Application Priority Data

Apr. 23, 2002 (DE) .......................................... 102 18 017

(51) Int. Cl.[7] ................................................ B60T 8/32
(52) U.S. Cl. ........................... 701/93; 701/96; 340/903
(58) Field of Search ............................. 701/93, 96, 91; 340/903, 435; 180/170

(56) References Cited

U.S. PATENT DOCUMENTS

| 4,747,269 A | * | 5/1988 | David .......................... 60/445 |
| 2002/0018003 A1 | | 2/2002 | Andreas et al. | |
| 2002/0133285 A1 | * | 9/2002 | Hirasago ...................... 701/96 |

FOREIGN PATENT DOCUMENTS

| DE | 197 04 890 | 8/1998 |
| DE | 199 58 520 | 6/2001 |
| EP | 992 387 | 4/2000 |

OTHER PUBLICATIONS

Adaptive Cruise Control System–Aspects and Development Trends by Winner, Witte, Uhler and Lichtenberg, Robert Bosch GmbH, in SAE Technical Paper Series 961010, International Congress & Exposition, Detroit, Feb. 26–29, 1996.

* cited by examiner

Primary Examiner—Marthe Y. Marc-Coleman
(74) Attorney, Agent, or Firm—Kenyon & Kenyon

(57) ABSTRACT

A method of cruise control and distance regulation in motor vehicles, in which the distance from a vehicle driving in front is measured, and at least two operating modes (e.g., ACC and stop and go) are provided for the distance regulation, these modes being activatable in different overlapping speed ranges, and in which it is possible to switch between these operating modes in at least one direction only by a command by the driver. The speed of the vehicle driving in front is extrapolated into the future on the basis of the speed of one's own vehicle and the measured distance data and/or the relative speed data, and a switch prompt is output to the driver when the extrapolated speed is outside the allowed range for the current mode, and the current speed is within the allowed range for the other mode.

7 Claims, 3 Drawing Sheets

METHOD FOR CRUISE CONTROL AND DISTANCE REGULATION IN MOTOR VEHICLES

FIELD OF THE INVENTION

The present invention relates to a method for cruise control and distance regulation in motor vehicles, the distance from a vehicle driving in front being measured, and at least two operating modes being provided for the distance regulation, these modes being activatable in different overlapping speed ranges, and it being possible to switch between these operating modes in at least one direction only by a command by the driver.

BACKGROUND INFORMATION

There are known cruise control systems for vehicles, which make it possible to regulate the speed of the vehicle at a desired speed selected by the driver. If the vehicle has at least one distance sensor, e.g., in the form of a radar sensor, a stereo-camera system or the like, the vehicle speed may also be regulated in such a way that a suitable safety distance from a vehicle driving in front is automatically maintained. One example of such a control system, also known as an adaptive cruise control or ACC system, is described in the article "Adaptive Cruise Control System—Aspects and Development Trends" by Winner, Witte, Uhler and Lichtenberg, Robert Bosch GmbH, in SAE Technical Paper Series 961010, International Congress & Exposition, Detroit, Feb. 26–29, 1996.

However, complete detection and reliable evaluation of the traffic environment are still impossible with the available sensor devices, so these systems have in the past been suitable mainly for relatively stable traffic situations such as driving on a highway or an expressway. In city traffic or when driving at a low speed on a winding section of road, however, the uncertainties in detection of the particular relevant target object may result in an accident risk. For this reason, the ACC systems known in the past have been designed to be activated only above a certain limit speed.

There have already been proposals for expanding the range of applications of the ACC system to include a traffic situation known as stop-and-go traffic which occurs, for example, in traffic congestion or slow-moving traffic. This traffic situation is also relatively stable and is therefore suitable for automatic cruise control, but the functionality must be expanded to include automatic control of stop-and-go driving situations.

In addition, the range of applications of this stop-and-go function should be limited to speeds below a certain level, and the speed ranges for the ACC function and the stop-and-go function may overlap.

Since the regulation algorithms in the ACC mode designed for high driving speeds and the stop-and-go mode designed for low driving speeds are different, it is expedient for the transition between these two modes not to be automatic, but instead to depend on a command to be entered by the driver, so that the performance of the system as a whole remains transparent for the driver.

European Patent Application No. 992 387 describes a control and regulation method in which a stop-and-go mode is activatable only under certain conditions. One of these conditions is that the driving speed of one's own vehicle must be below a definable limit speed. If the conditions for stop-and-go mode are met, the system will first enter a standby state, which is displayed for the driver and is thus represented to the driver as a prompt to activate the stop-and-go mode. If the conditions for regulation in stop-and-go mode are no longer met, e.g., because the vehicle being pursued as a target object is temporarily lost from the detection range of the distance sensor, then the system enters a mode known as "coasting mode" in which the vehicle speed is reduced with moderate deceleration. The driver is able to shut down the regulation entirely either by input of a shutdown command or, if the conditions are met again, switch it back to stop-and-go mode. In addition, the driver has the option of switching to the normal control mode (ACC) if the conditions for this are met.

SUMMARY OF THE INVENTION

An object of the present invention is to provide a method which will facilitate situation-appropriate switching from the current function mode into another function mode.

This object is achieved according to the present invention by the fact that the speed of the vehicle driving in front is extrapolated into the future on the basis of the speed of one's own vehicle and the measured distance data and/or the relative speed data, and a switch prompt is output to the driver when the extrapolated speed is outside the allowed range for the current mode and the current speed is within the allowed range for another mode.

If the driving speed is in the overlap range in which both control modes are activatable in principle, then according to the present invention, a check is likewise performed "prospectively" according to the present invention on the basis of the movements of the vehicle driving in front to determine whether it is possible to expect that the speed will soon depart from the allowed speed range for the current mode and the driver will be prompted by the switch prompt to enter the switch command before actually reaching the limit speed. This makes it possible to avoid a system response that would be irritating for the driver or for the traffic environment on reaching the limit speed.

For example, if one vehicle is driving behind another vehicle in stop-and-go mode, and the vehicle driving in front accelerates significantly and persistently, then it is possible to foresee that the vehicle driving in front will soon exceed the limit speed for stop-and-go mode. The control system will react with an acceleration of one's own vehicle to keep one's distance from or more precisely the time interval (distance divided by absolute speed) from the vehicle driving in front. Without intervention on the part of the driver, however, this acceleration would be interrupted as soon as the allowed limit speed for stop-and-go mode, e.g., 50 km/h, is reached. Then it would take a while for the driver to notice that the distance from the vehicle driving in front has increased and until he would respond to this appropriately, e.g., by switching to ACC mode or by assuming control himself by depressing the gas pedal. To avoid unnecessarily interfering with the flow of traffic, the driver would then have to attempt to catch up with the distance from the vehicle driving in front by a greater acceleration accordingly. This would then result in unsteady operation and increased fuel consumption. Therefore, according to the present invention, the driver is prepared for this situation already by the switch prompt, so he is able to respond promptly and there is no excessive increase in the distance from the vehicle driving in front.

The future speed of one's own vehicle may be determined on the basis of the absolute speed of the vehicle driving in front. If the distance sensor is a radar sensor which permits a direct measurement of the relative speed of the vehicle driving in front, then it is possible to determine the absolute speed of the vehicle driving in front by adding the measured relative speed to the known absolute speed of one's own vehicle.

The speed of the vehicle driving in front is preferably also extrapolated into the future. In the simplest case, this is done by forming the time derivation of the absolute speed and multiplying it by a definable time interval and then adding the product to the current absolute speed. Refinements are possible, e.g., by taking into account higher derivations of the absolute speed (i.e., approximately a change in acceleration over time) and/or varying the length of the time interval used for the extrapolation on a situation-dependent basis, e.g., as a function of the speed of one's own vehicle.

It is self-evident that this method may be used not only for the transition from stop-and-go mode to ACC mode but also for the transition from stop-and-go mode to manual control or—when the speed drops below an allowed lower limit speed for ACC mode—also for the transition from ACC mode to stop-and-go mode.

The switch prompt may appear visually, for example, by a lamp coming on or flashing on the dashboard and optionally or additionally also acoustically.

In a preferred embodiment, suitable display lamps or symbols on the instrument panel of the vehicle indicate which control mode is currently active and in addition which mode is currently activatable. The switch prompt according to the present invention may be expediently integrated into this display concept.

DETAILED DESCRIPTION

Figure 1:
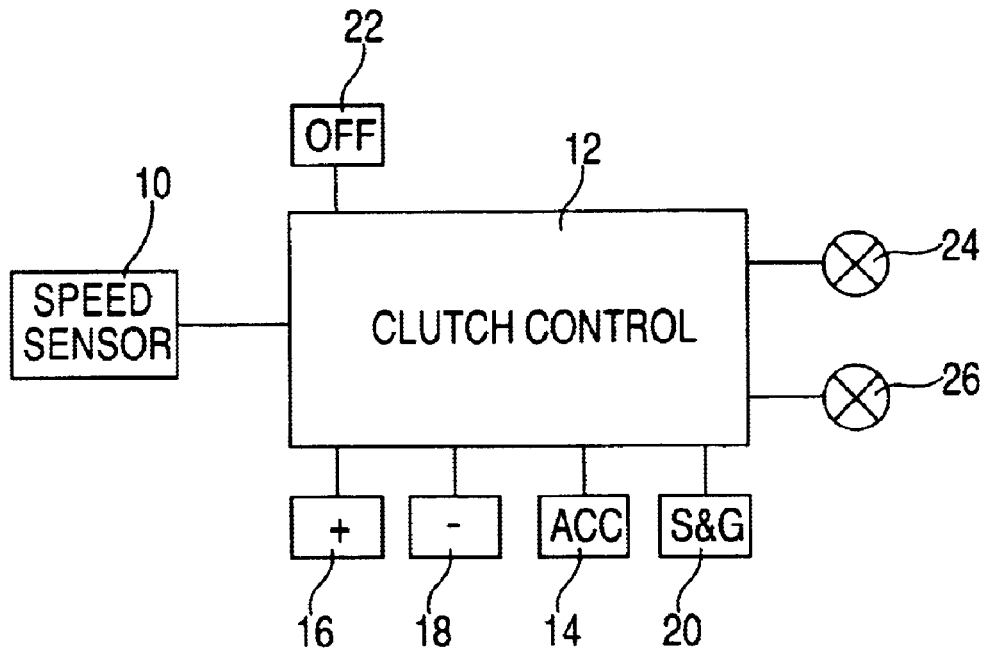
FIG. 1 shows a block diagram of a cruise control and the respective operating and display elements.

Since the design and operation of a cruise control having an ACC function are known, FIG. 1 shows only the most important components in a block diagram. A sensor device includes a distance sensor 10, e.g., a radar sensor, which measures the distance and the relative speed of a vehicle driving in front. If the radar sensor detects multiple target objects, e.g., multiple vehicles or standing targets, such as street signs and the like, the target object is selected by a plausibility analysis.

The sensor device also includes known sensors, e.g., a driving speed sensor, acceleration sensors for detecting the longitudinal acceleration and the transverse acceleration, a yaw rate sensor and the like, which are present in the vehicle anyway, and whose signals are also used for other regulation purposes. The signals of the distance sensor and the other sensors are analyzed in an electronic control device 12, which is formed by a microcomputer, for example. Control device 12 acts on the drive and brake system of the vehicle to regulate the driving speed either at a desired speed, as selected by the driver, or at a suitable distance from the vehicle driving in front.

This control mode, referred to below as the ACC mode, is activated by the driver by operation of an ACC button 14. If a desired speed has already been stored, operation of the ACC button will have the function of resuming regulation at this desired speed. Otherwise, the desired speed is set when the driver briefly operates a button 16 after the vehicle has reached the desired speed. Continued or persistent operation of button 16 causes an incremental increase in the desired speed. Similarly, operation of a button 18 causes an incremental reduction in the desired speed.

ACC mode is switched off automatically as soon as the speed of the vehicle has fallen below a certain value $V_1$ of 40 km/h, for example. As soon as the speed is below a larger value $V_2$, e.g., 50 km/h, however, the driver may activate a stop-and-go mode by operating a button 20. The driver may make use of this option, e.g., when approaching traffic congestion. The stop-and-go mode then causes the vehicle to be brought automatically to a standstill a suitable distance away from the traffic congestion. When the vehicle stopped in front of one's own vehicle drives ahead a certain distance, stop-and-go mode will cause one's own vehicle to start driving forward again either automatically or triggered by the driver, depending on the situation, so that one's own vehicle drives forward a corresponding distance. The speed of one's own vehicle is automatically limited to speed $V_2$ or a lower desired speed selected by the driver with the help of buttons 16 and 18.

Cruise control may be deactivated by depressing a button 22, regardless of whether stop-and-go mode or ACC mode is currently active.

Figure 2:
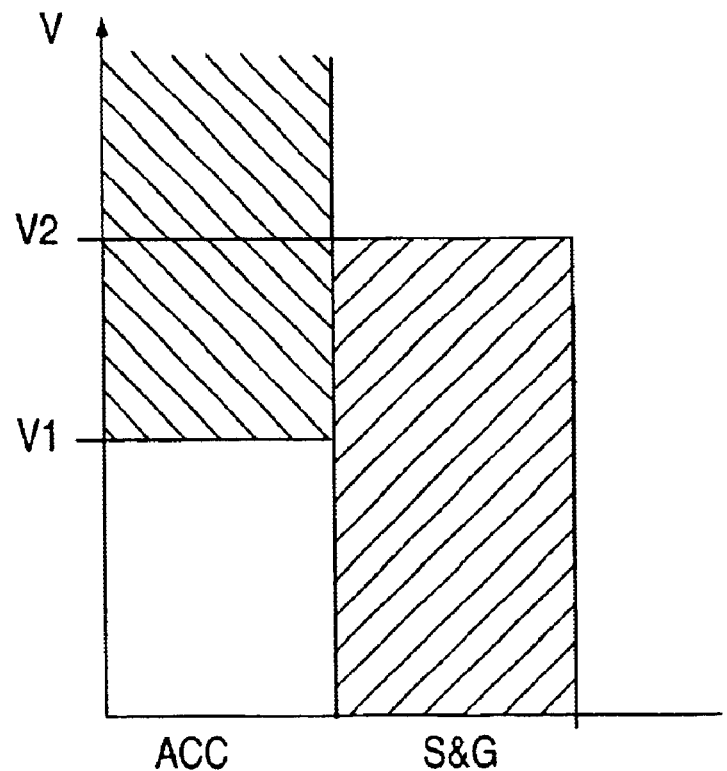
FIG. 2 shows different functions of the cruise control that are applicable.

FIG. 2 illustrates the speed ranges in which the ACC mode and stop-and-go mode are activatable. The two modes are activatable but mutually exclusive in the speed range between $V_1$ and $V_2$.

When a display lamp 24 (FIG. 1) lights up, it indicates that the ACC mode is active. This display lamp 26 has an intermediate state between the on and off states. This intermediate state is formed, for example, by the fact that the lamp lights up with a weaker light, a different color or only a frame around the lamp lights up to indicate that the ACC mode is activatable but not active. Accordingly, when display lamp 26 lights up or is in an intermediate state, this indicates that stop-and-go mode is active or activatable, respectively.

By operating the gas pedal, the driver is able to override both the ACC function and the stop-and-go function to temporarily accelerate to a higher speed. However, operation of the brake pedal, like operation of button 22, has the effect of deactivating the cruise control. When the driver himself has braked the vehicle to a standstill, the stop-and-go mode cannot be activated again from this stationary state, but instead it is activatable only after the driver himself has resumed motion of the vehicle by operating the gas pedal.

When stop-and-go mode is active and the vehicle driving in front accelerates to a speed of 50 km/h or more, e.g., when congestion breaks up, then one's own vehicle will also accelerate, and as soon as speed $V_1$ is exceeded, display lamp 24 will switch to the intermediate state. This indicates to the driver that he may now switch back to ACC mode. If the driver fails to make this switch, the speed of one's own vehicle will not increase above 50 km/h. This may result in an unwanted hindrance in traffic flow, e.g., when congestion breaks up, e.g., the traffic congestion at construction site traffic lights. The intermediate state of display lamp 24 informs the driver only that a switch is possible, but it does not emphatically indicate traffic situations in which a switch is not only possible but is also recommended. To this end, a special switch prompt is provided according to the present invention. For the decision regarding output of this switch prompt, a method is implemented in control device 12 and explained below with reference to FIGS. 3 and 4.

Figure 3:
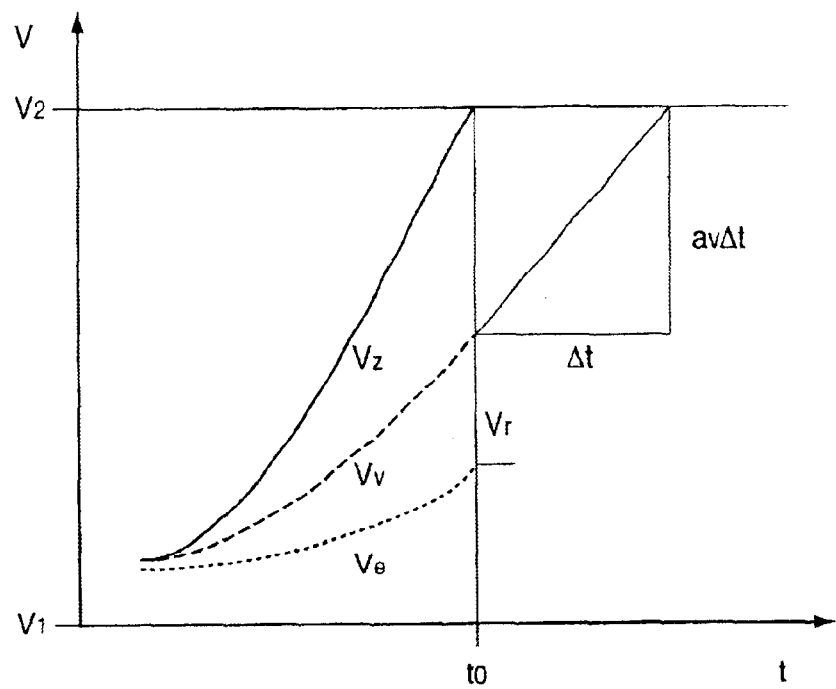
FIG. 3 shows a speed/time diagram to illustrate the method according to the present invention.

FIG. 3 illustrates the situation in which one's own vehicle is traveling at a speed $V_e$ between speeds $V_1$ and $V_2$. A vehicle driving in front is traveling at speed $V_v$ (absolute speed). This speed $V_v$ is calculated in control device 12 by adding relative speed $V_r$ measured by distance sensor 10 to speed $V_e$. At first $V_v$ is equal to $V_e$, i.e., the vehicle driving in front is followed at a constant distance. Then, however, the vehicle driving in front is accelerated so that $V_v$ and at first also $V_r$ increase. Control device 12 responds to this by accelerating one's own vehicle so that $V_e$ also increases with a certain time lag.

The switch prompt to the driver should be output when it is possible to foresee that speed $V_v$ of the vehicle driving in front will increase permanently above limit speed $V_2$, above which it is no longer possible for stop-and-go mode to be active. In the method described here, speed $V_v$ may still be extrapolated into the future for a certain time interval Dt by adding a term $a_v \cdot Dt$, where $a_v$=acceleration of the vehicle driving in front. This extrapolation yields the (presumed) future speed $V_z$ of one's own vehicle. If this speed $V_z$ is greater than or equal to limit speed $V_2$, then the switch prompt is output. In the example illustrated in FIG. 3, this is possible for the first time at time $t_0$.

Figure 4:
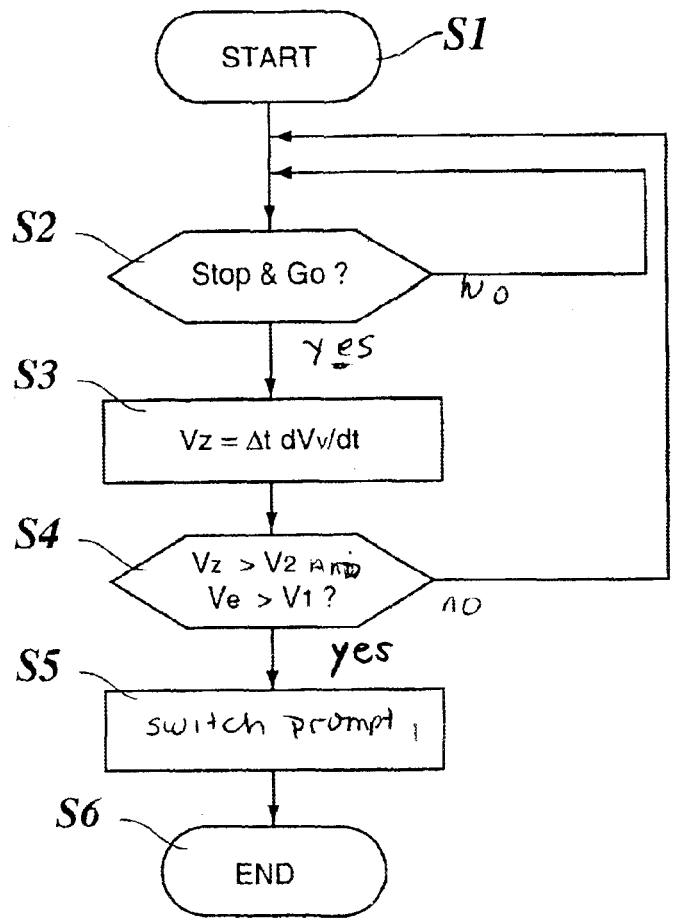
FIG. 4 shows a flow chart to explain the method.

FIG. 4 illustrates the particular decision-making procedure. In step S1, a program routine is started and then repeated periodically at short intervals. In step S2, a check is performed to determine whether the current mode of the control system is the stop-and-go mode. As long as this is not the case, step S2 is repeated cyclically. If the system is in stop-and-go mode, then future speed $V_z$ is calculated in step S3. In step S4 a check is performed to determine whether $V_z$ is greater than $V_2$ and at the same time whether $V_e$ is greater than $V_1$. Under these circumstances stopping the stop-and-go mode and—more specifically—switching to ACC mode are not only acceptable but are actually recommended on the basis of the traffic situation. Accordingly, in step S5, the switch prompt is output to the driver, after which the program is terminated in step S6. If the conditions checked in step S4 are not met, the system jumps back to step S2.

In this way, it is possible to indicate to the driver promptly that he should switch out of stop-and-go mode.

If the switch prompt includes a visual display, it will go out after a defined period of time has elapsed or at the latest when the driver inputs the switch command or the shutdown command by operating button 14 or button 22.

Limit speed $V_2$ need not necessarily be used as the threshold value with which future speed $V_z$ of one's own vehicle is compared, but instead a slightly higher threshold value may also be selected. Likewise, it may be expedient to provide a certain time hysteresis so the switch prompt is output only when the threshold value (e.g., $V_2$) is exceeded continuously for a certain period of time (less than Dt).

Whereas the method described above concerns the transition from stop-and-go mode to ACC mode, a similar method may also be provided for the transition from ACC mode to stop-and-go mode. In this case, the switch prompt is output when extrapolated future speed $V_z$ drops below speed $V_1$.

Figure 5:
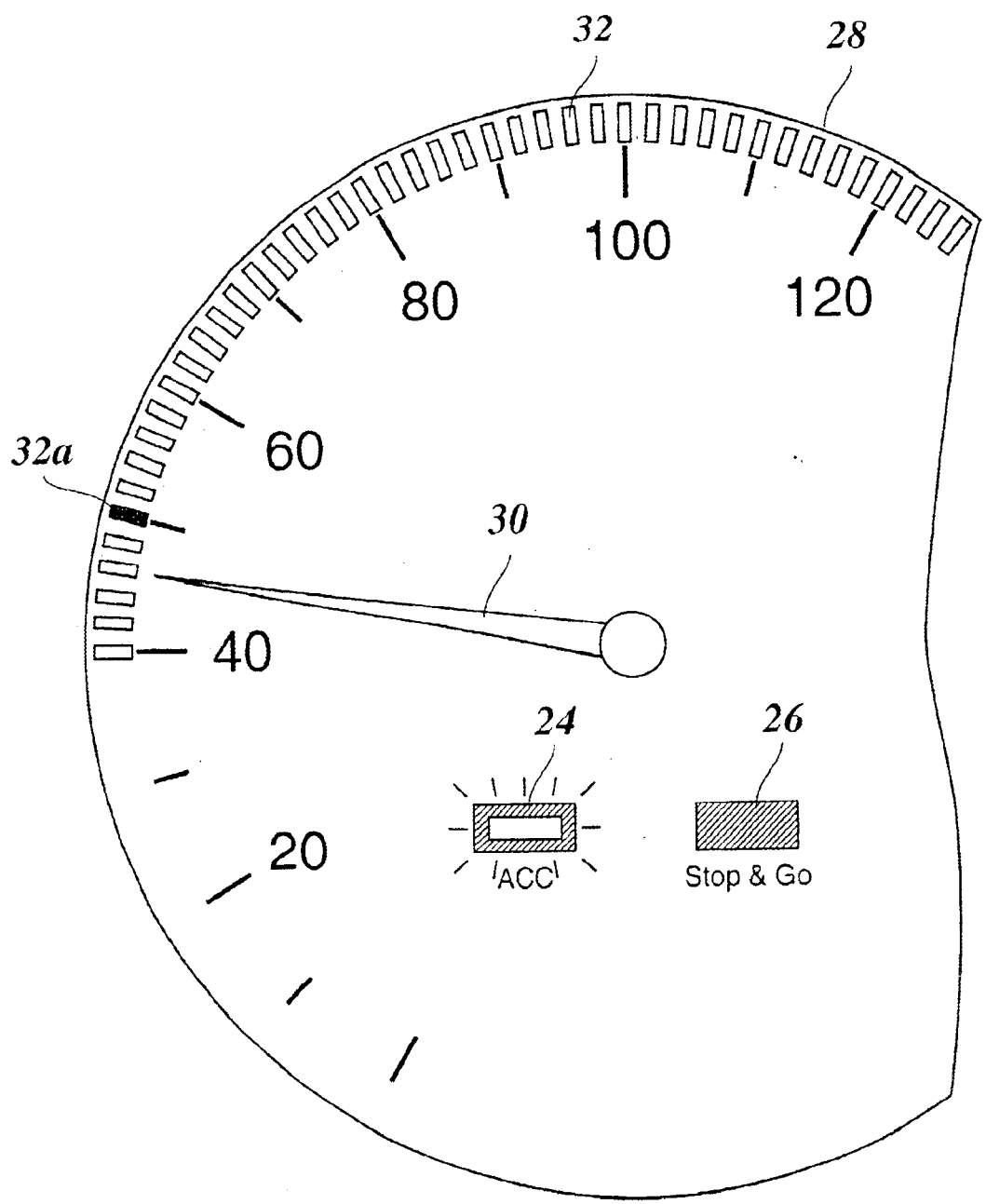
FIG. 5 shows a display device integrated into a speed indicator on the dashboard of the vehicle.

FIG. 5 shows a driving speed indicator 28 such as that usually provided on the dashboard of a motor vehicle. As usual, speed indicator 28 has a speed scale and a tachometer needle 30 and also includes above-mentioned display lamps 24 and 26 for the ACC function and the stop-and-go function.

The example shown here illustrates the situation at time $t_0$ in FIG. 3. The current driving speed is 46 km/h and is thus between speed $V_1$ of 40 km/h and speed $V_2$ of 50 km/h, so that both ACC mode and stop-and-go mode could be active. The stop-and-go mode is active here, so that display lamp 26 is turned on completely, whereas only a frame of display lamp 24 lights up. This indicates that although the ACC mode is activatable, it is not active. The switch prompt may then include, for example, the frame of display lamp 24 beginning to flash, as illustrated symbolically in FIG. 5.

The display device of the cruise control also includes a plurality of LEDs 32, which are distributed uniformly over the speed scale with a resolution of 2 km/h in the speed range above 40 km/h. Lighting up of one of these LEDs 32 indicates the desired speed set by using one of buttons 16, 18. However, since the stop-and-go function is active and not the ACC function, the vehicle speed also does not increase beyond 50 km/h ($V_2$), even when the traffic situation would allow higher speeds. This means that if no distance regulation is necessary, the speed is regulated at a setpoint speed of 50 km/h. When LED 32*a*, which corresponds to the setpoint speed of 50 km/h, lights up, this indicates that the speed in stop-and-go mode is limited to this value. The switch prompt may optionally also include flashing of LED 32*a*. The additional output of a short signal tone is expedient.

What is claimed is:

1. A method for cruise control and distance regulation in a motor vehicle, comprising:
    measuring a distance from a vehicle driving in front;
    providing at least two operating modes for the distance regulation, the at least two operating modes being activatable in different overlapping speed ranges, a switching between the at least two operating modes in at least one direction being possible only by a command by the driver;
    extrapolating a speed of the vehicle driving in front into the future on the basis of a current speed of one's own vehicle and at least one of (a) measured distance data and (b) relative speed data; and
    outputting a switch prompt to the driver when the extrapolated speed is outside an allowed range for a current mode and the current speed is within an allowed range for another mode.

2. The method according to claim 1, wherein one of the at least two operating modes is a cruise control and distance regulation mode which is activatable only above a lower limit speed, and another of the at least two operating modes is a stop-and-go mode which is activatable only below an upper limit speed.

3. The method according to claim 2, wherein the switch prompt is output when the extrapolated speed is above a threshold value, which is at least equal to the upper limit speed, and when the current speed of the vehicle is above the lower limit speed.

4. The method according to claim 1, wherein the extrapolated speed is determined on the basis of an absolute speed of the vehicle driving in front.

5. The method according to claim 4, wherein the absolute speed of the vehicle driving in front is extrapolated on the basis of an acceleration of the vehicle.

6. A control device for cruise control and distance regulation in a motor vehicle, comprising:
    means for receiving, from a distance sensor, measured data with respect to at least distance and relative speed variables of a vehicle driving in front;
    means for receiving measured data with respect to a speed of one's own vehicle;

means for receiving at least one signal from at least one operating element operable by the driver, the at least one signal representing a switch between at least two operating modes;

means for extrapolating into the future a speed of the vehicle driving in front on the basis of a current speed of one's own vehicle and at least one of (a) measured distance data and (b) relative speed data; and means for outputting a switch prompt to the driver when the extrapolated speed is outside an allowed range for a current mode and the current speed is within an allowed range for another mode.

7. The control device according to claim 6, wherein the distance sensor is a radar sensor.

* * * * *